(No Model.)

J. C. REIMANN.
CALIPERS.

No. 499,039. Patented June 6, 1893.

WITNESSES:
Paul Johst
C. Sedgwick

INVENTOR
J. C. Reimann
BY
Munn & Co.
ATTORNEYS.

UNITED STATES PATENT OFFICE.

JOHANN C. REIMANN, OF UNION, NEW JERSEY, ASSIGNOR TO FRANK J. STUKE, OF SAME PLACE.

CALIPERS.

SPECIFICATION forming part of Letters Patent No. 499,039, dated June 6, 1893.

Application filed March 11, 1893. Serial No. 465,495. (No model.)

*To all whom it may concern:*

Be it known that I, JOHANN C. REIMANN, of the town of Union, county of Hudson, and State of New Jersey, have invented a new and useful Improvement in Calipers, of which the following is a full, clear, and exact description.

My invention relates to an improvement in calipers and it has for its object to provide calipers especially adapted for use in measuring a horse for a collar.

The object of the invention is to construct the calipers in a simple, durable and economic manner, and to provide a means whereby when the members of the calipers are manipulated to take a measurement, the measurement of the space between the measuring points of the calipers may be readily calculated from a scale produced upon a portion of the article.

Another feature of the invention consists in so forming the calipers that they may be folded when not in use, and will thus occupy but little space and may be readily carried in the pocket.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1:
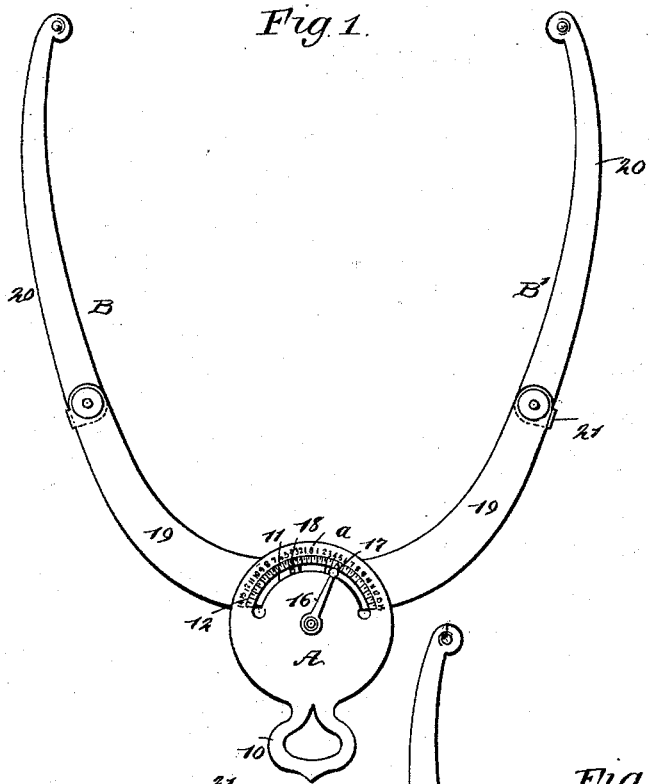
Figure 2:
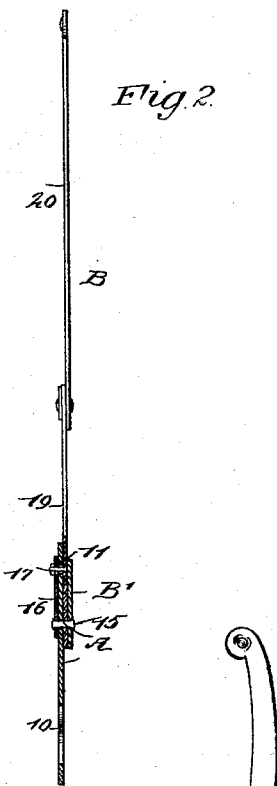
Figure 4:
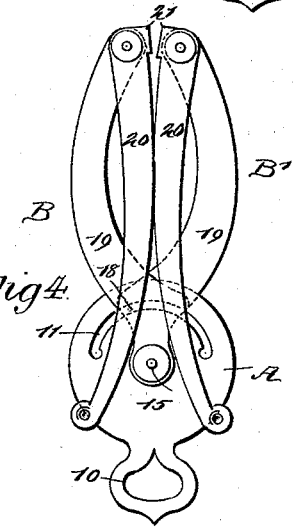
Figure 3:
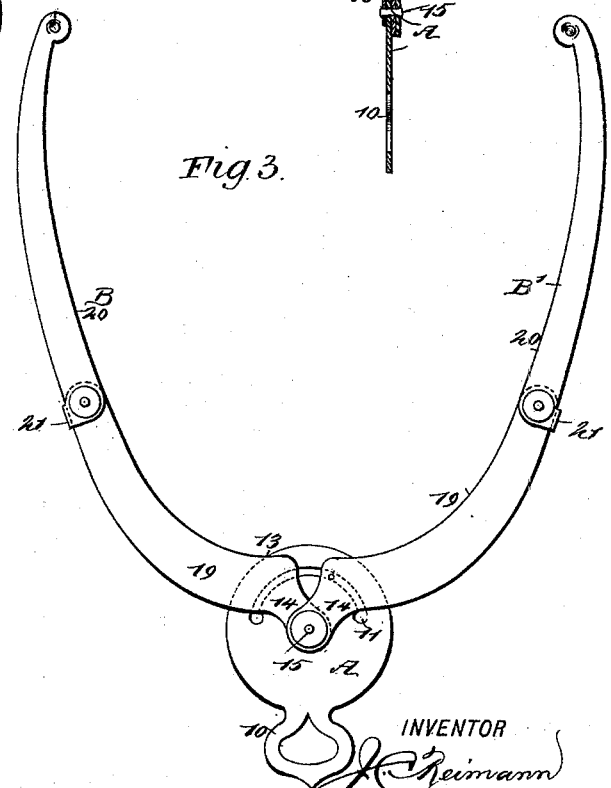

Figure 1 is a front elevation of the calipers having the members extended. Fig. 2 is a vertical section through the central portion of the calipers. Fig. 3 is a rear elevation of the calipers, the members thereof being in an extended position; and Fig. 4 is a rear elevation of the calipers in their folded position.

Any material may be employed in the construction of the calipers; ordinarily, however, metal is used, and sheet metal is preferred. The calipers comprise a body or handle section A and two measuring arms B and B'. The body A, may be of any desired shape; ordinarily, however, it is made semi-circular, as shown in the drawings, and has integral with it or attached thereto a handle 10, located at its lower end. The body near its upper edge is provided with a semi-circular slot 11, and around the upper margin of this slot two scales 12, are produced, each scale starting from naught, or a cipher, located at the center of the slot 11, as shown at $a$ in the drawings; therefore, the scales are constructed upon the lines of an arc. Each scale reads in the direction of the ends of the slot over which it is located, from "1," for example, to "14," the figures representing inches; but they may be made to represent feet if in practice it is found desirable; and the scale likewise includes marks between the members, which designate fractions of an inch or fractions of a foot, or whatever measurement is indicated by the numerals.

The arms B and B', are curved, and their inner edges are concaved, while their outer edges are preferably made convex. The two arms are preferably pivoted to the center of the body A, being curved in direction of each other, so that when the arms are brought together for connection to the body they will be practically of a U-shape when extended. Each arm at its inner curved section 13, is provided with an extension 14, the said extensions being carried downward from the body of the arms and somewhat at an angle thereto, as shown best in Fig. 3. The extensions of the arms are made to overlap, and a pivot pin 15, or an equivalent device, is passed through the overlapping extension sections and through the body A. A pointer or hand 16, is secured upon the pivot 15 at the front of the body, and the said hand extends over the slot 11 in the body upon one of the scales; and the hand is secured by means of a pin 17, or its equivalent to the arm B', for example, the pin being located a predetermined distance from the inner edge of the arm. Thus when that arm is moved the hand is carried with it and will pass over the face of the scale. The opposite arm B, is provided with a depression 18, projection, or a mark of any desired character, the mark being located about the same distance from the inner edge of that arm as the pointer is located from the inner edge of the opposite arm; and when the upper ends of the arms are brought together so that one will engage with, or one will overlap the other, the mark 18 upon the arm B, will be immediately beneath the pin fastening the hand upon the arm B', and the hand will be immediately under the cipher.

In taking the measurement of a horse's neck, for example, to get the size of the collar, the arms are gradually and uniformly carried in opposite directions until the upper end of one arm shall rest upon the top of the neck while the end of the opposite arm will be brought to an engagement with the lower portion of the neck near the breast, or at whatever point the collar is to touch. The pointer or hand will then have traveled over one of the scales, while the mark 18 upon the opposite arm will have been made to travel along or close to the opposite scale, and the measurement of the distance between the ends of the extended arms, which distance will represent the desired length of the collar, may be readily computed by adding together the figures adjacent to which the marker 18 and the hand 17, are located—as, for example, if the hand points to "5" and the marker 18 is opposite "7" in its scale, the distance between the ends of the arms will be the sum of the two, namely, twelve. This scale is accurate, and it will be readily understood that the measurements of both the length and of the width of the collar may be taken in the same manner. It is further obvious that the calipers constructed as above set forth may be used for taking any measurements whatever where it is desired to quickly ascertain, without the aid of a rule or other measure, the dimensions of parts to be measured.

In order to facilitate carrying a pair of calipers made as large as would be required for taking the measure of horses' necks, the arms B and B', are made in two pivotally connected sections, the lower sections being designated as 19 while the upper sections are designated as 20. The sections are limited in their outward movement by any approved form of stop. One form of such a stop is illustrated in Fig. 1, in which a flange 21, is projected from the outer edge of the upper section of the arm at or near its pivotal connection with the lower section; and this stop is shaped upon the lines upon which the outer edge of the complete arm is made. Thus when the calipers is not in use, the upper sections are folded down upon the lower sections until they extend side by side, or one over the other along the back of the body, and at that time the upper ends of the lower arm sections are brought together, thus materially reducing the size of the calipers both in width and in length.

The advantages of a calipers constructed as above set forth are apparent; it is not only simple and durable in its construction, but it is capable of being expeditiously and conveniently manipulated, and the measurements taken thereby may be computed by any one understanding addition.

Having thus described my invention, I claim as new and desire to secure by Letters Patent—

1. As an improved article of manufacture, calipers, the same comprising a body, arms pivotally connected with the body, the body being provided with scales arranged upon the arc of a circle and reading in opposite directions, and indicators connected with the arms and adapted to travel one along each scale, as and for the purpose set forth.

2. Calipers for the purpose described, consisting of a body having a semi-circular or segmental slot produced therein, and scales produced along the edge of the slot, the scales being two in number and extending in opposite directions from a central point over the slot, arms pivoted upon the body, and an indicator carried by each of the arms, each indicator traveling along one of the scales when the arms are manipulated, as and for the purpose set forth.

3. In calipers of the character described, the combination, with a body having scales produced thereon reading in opposite directions from a central point, the scales being arranged upon the arc of a circle, and representing feet, inches or yards, of arms pivoted upon the body one over the other, the said arms being constructed in pivotally connected sections, and indicators connected one with each arm, each indicator traveling along one of the scales as the arms are moved, whereby the distance between the measuring points of the arms may be calculated, and the calipers may be folded to occupy but little space when not in use, substantially as set forth.

JOHANN C. REIMANN.

Witnesses:
CHARLES L. SMITH,
FERDINAND ZIEBELL.